3,370,017
MICROCRYSTALLINE CORUNDUM POWDER, SOLS THEREOF, AND PROCESSES FOR PREPARING BOTH
Horacio E. Bergna and Ralph K. Iler, Wilmington, Del., assignors to E. I. du Pont de Nemours and Company, Wilmington, Del., a corporation of Delaware
No Drawing. Filed July 30, 1963, Ser. No. 298,580
10 Claims. (Cl. 252—309)

ABSTRACT OF THE DISCLOSURE

Crystalline alpha alumina containing less than 1 percent of hydrofluoric acid-soluble material, and having a specific surface area of greater than 10 square meters per gram, a cold pressed density of at least 2.0 grams per cubic centimeter at 10 tons per square inch, and having an X-ray crystallite size of less than 160 millimicrons, is prepared by grinding corundum, separating the fraction finer than 160 millimicrons in particle size, contacting this fraction with hydrofluoric acid, separating the acid-insoluble alumina, replacing adsorbed fluorine ions by contacting the alumina with a weak base, and recovering the alumina.

---

This invention relates to crystalline alpha alumina or corundum characterized by high packing density and to processes for making it and is more particularly directed to particulate corundum as dry products or sols and to processes for their production.

Briefly, the products of this invention are characterized by:

(a) containing less than 1% by weight, based on the alumina, of metal oxides that are soluble in aqueous hydrofluoric acid,
(b) having a specific surface area greater than 10 square meters per gram,
(c) having a cold pressed density under a pressure of 10 tons per square inch of at least 2.0 grams per cubic centimeter,
(d) having a crystallite size determined by X-ray diffraction, of less than 160 millimicrons.

While the term "corundum" in its usual sense denotes the alpha crystalline form of pure alumina, the corundum crystal structure, consisting predominately of alumina, can nevertheless contain from 0.01 up to as high as 2 or 3% of other metal oxides which form a solid solution within the alpha alumina crystalline lattice. The most common metal oxide is $Cr_2O_3$. However, there are also often present titanium oxide, probably in the form of $Ti_2O_3$ and iron oxide as $Fe_2O_3$, in solid solution within the alpha alumina crystalline lattice.

Thus, by "corundum" as used herein, is meant the alpha crystalline form of $Al_2O_3$ which can be 99.99% pure, or which can contain in solid solution within the alpha alumina crystalline lattice, chromium oxide, titanium oxide and iron oxide. These metal oxides generally color the corundum, the effect of chromium oxide being the best known, producing red corundum, otherwise known as "ruby."

It is to be understood, however, that while these oxides can be present up to amounts as high as 2 or 3%, they are not soluble in hydrofluoric acid because they are locked within the alpha alumina crystalline lattice in the form of solid solutions. Thus, by the products of the invention being defined above as corundum containing less than 1% by weight, based on the alumina, of metal oxides that are soluble in aqueous hydrofluoric acid, this means exclusive of metal oxides which except for being in solid solution within the alpha alumina crystalline lattice, would be so soluble.

In general, the processes of this invention produce microcrystalline corundum having a crystallite size of less than 160 millimicrons diameter, as measured by broadening of the X-ray diffraction lines. This is accomplished by the steps of:

(a) subjecting the microcrystalline corundum to attrition to produce discrete particles characterized by having a cold pressed density of at least 2.0 grams per cubic centimeter,
(b) separating the colloidal corundum from coarser material,
(c) purification of the corundum by contacting the corundum with an excess of strong aqueous solution of hydrofluoric acid,
(d) recovering the corundum from acid solution with exclusion of soluble aluminum salts,
(e) contacting the corundum with a weak base to replace adsorbed fluoride ions by hydroxyl groups, and
(f) separating the fluoride-free corundum from the solution of base by washing out the base.

The particulate corundum of this invention is useful for molding dense, strong bodies of pure alumina under a pressure of 4000 p.s.i. in a graphite mold at the unusually low temperature of 1500° C. At higher pressures, even lower temperatures can be employed. Heretofore no known form of alumina could yield a dense, pore-free, strong, pure alumina ceramic body at such low temperatures. Molding at low temperatures is desirable for it not only minimizes erosion of the mold, but also it is thus possible to reproducibly mold pure alumina with a grain size of only a few microns and unusually high strength. At the higher temperatures required for molding the alumina powders heretofore available, coarser grained and more porous products are obtained.

The particulate corundum of this invention is also useful as an ultrafine polishing material, being free from particles larger than a half micron in size which heretofore have caused microscopically visible scratches on surfaces being polished. Thus, smoother surfaces, on metals for example, can be produced than when conventional aggregated particles of fine alpha alumina having a crystallite size of about 300 millimicrons is used.

Relatively fine crystals of corundum have been produced by several methods in the past. One method has been to heat an alumina hydrate or "transition alumina" at minimum temperature to produce fine corundum crystals. However, even under the most controlled conditions, corundum crystals which are only about as small as 300 millimicrons have been obtained and in such products, the crystallites are fused together into aggregates which prevent packing under pressure to a density of 2 g./cc. Also, up to 15% of the alumina is present as theta or other non-corundum forms which are soluble in aqueous hydrofluoric acid.

Another method has been to grind corundum in a ballmill for several days. In a study by Carruthers and Gill ("Properties of Calcined Alumina," Parts I and II, Brit. Ceram. Soc. Trans. 54, 59–82 (1955)), different types of alumina hydrates were heated at temperatures up to the fusion point of $Al_2O_3$ and the resulting types of corundums were then exhaustively ballmilled. This resulted in corundums having a specific surface area of 2 to 3 square meters per gram, corresponding to one-half micron particles. With corundum prepared at the lowest temperature, the product had a specific surface area of as high as 5 m.²/g., and the crystals ware approximately 300 millimicrons in diameter, but these existed as large 100 microns aggregates which are rigid and porous. It is found that such aggregates can be cold-pressed to a density of only about 1.2 to 1.5 g./cc., and even after being extensively milled or ground, the pressed density is only 1.8 g./cc. because some aggregates still persist.

Alumina of the gamma, eta, or other transition forms has been produced in extremely finely divided form by a "fume" process in which alumina compounds are volatilized in a combustion flame and the resulting aluminum oxide collected. By heating such aluminas at about 1150° to 1200° C., corundum can be obtained which appears to have a crystallite size, determined by the X-ray method, of about 160 millimicrons, with a specific surface area of from 40 to 80 m.²/g. However, when this resulting product is treated with aqueous hydrofluoric acid, it is found that only 15% to 30% of the alumina is in the insoluble corundum form. When this corundum is isolated, it proves by X-ray examination to have a crystallite size of over 200 millimicrons, and a specific surface area of about 7 m.²/g.

Thus in the past aluminas have been reported which appear to have high specific surface area and a crystallite size as small as 160 millimicrons, but these are contaminated with finer transition forms of alumina which may distort the X-ray pattern to make the particle size appear smaller, and such transition forms also greatly increase the specific surface area. Such mixtures invariably have a cold pressed density lower than 2 g./cc. usually less than 1.5 g./cc.

It has now been found that by treatment of alumina containing the corundum form with 20% to 30% by weight aqueous hydrofluoric acid, all other forms of alumina except the corundum are removed. In rare instances where the kappa form is present, it is found that this is very slowly dissolved, but for the purposes of this invention the presence of a few percent of kappa along with the alpha or corundum form does not interfere with attainment of the advantageous high packing density.

It is believed that treatment with hydrofluoric acid also removes traces of silica from the surface of the corundum particles and that this provides the means for performing a preferred process of this invention for preparing a weakly acidic colloidal suspension of corundum. It has been found that even with ballmilled, relatively pure corundum such as tabular alumina, more stable aqueous colloidal suspensions at pH 3.5–4.0 can be made if the alumina is first treated with hydrofluoric acid, the fluoride then completely removed and the suspension adjusted to the desired pH with hydrochloric acid or other such strong monobasic acid. Thus, it would seem that traces of silica which are usually found in even the purest commercial aluminas, are removed from the surface of the corundum particles by the hydrofluoric acid treatment. In the absence of such treatment, the silica forms negatively charged sites on the particles which are otherwise positively charged in acidic suspension, causing flocculation of the particles.

It also appears that the treatment of milled corundum with hydrofluoric acid removes amorphous alumina from the surface. Even with the purest coarse corundum, it is found that after being intensively ballmilled, several percent of the alumina dissolves in hydrofluoric acid. If the step of treating the alumina with hydrofluoric acid is omitted, the pH of the acidic corundum suspensions will not remain in the preferred range of 3.0 to 3.5, but slowly rises to 4.0 or higher. Accordingly, these suspensions tend to flocculate interfering with the separation. Thus, it would seem that the treatment with hydrofluoric acid removes amorphous alumina, which would be responsible for this slow rise in pH. However, treatment with hydrofluoric acid is not necessarily a prerequisite step for the formation of a corundum suspension. As described hereinafter, the milled alumina can be suspended in various ways and in some, the presence of amorphous alumina or silica is not detrimental. In such instances, the finely divided fraction can be first recovered and then treated with hydrofluoric acid if this fraction contains hydrofluoric acid-soluble substances to the extent of more than one percent of the weight of solids.

Also, according to this invention, the milled alumina is deflocculated to form a colloidal suspension at one point in the process, to separate and recover the colloidal fraction. If this is not done, the fine colloidal particles appear to adhere to coarser ones, and are carried along with them and cannot be recovered.

DETAILS OF THE INVENTION

(I) The product—Characteristics

The product of this invention is a particulate corundum containing less than 1% by weight of substances soluble in aqueous hydrochloric acid, having a specific surface area greater than 10 m.²/g., having a cold pressed density at 10 t.s.i. of at least 2 g./cc., and having a crystallite size determined by X-ray diffraction of less than 160 millimicrons.

Substances soluble in aqueous hydrofluoric acid include amorphous silica, hydrated aluminum oxides, and the "transition" aluminum oxides such as gamma, theta, or delta, as well as aluminosilicates such as mullite. These substances not only interfere with the processes of this invention whereby corundum particles of colloidal size are isolated, but also such substances often inhibit the attainment of high packing density, since these substances can act as cements to hold the corundum particles together in porous aggregates.

It should be understood that after the colloidal corundum of this invention has been isolated, other materials can be subsequently added, including silica, for specific purposes.

The corundum products of the invention have a specific surface area greater than 10 m.²/g., which means that the average particle size is less than 160 millimicrons diameter. Particles as small as 10 millimicrons, or even smaller can be produced, but, in general such fine particles are difficult to obtain in sufficient yields. In the preferred type of corundum of this invention, the particles are of relatively uniform size, 90% of them having particle diameters between about 40 millimicrons and 200 millimicrons. In the most highly preferred colloidal corundums, the specific surface area is about 20 m.²/g., corresponding to an average particle size of about 60 millimicrons diameter, with at least 90% of the corundum consisting of particles of from 45 to 125 millimicrons in diameter.

The corundum of this invention is essentially free from particles larger than 200 millimicrons in diameter. While occasional particles of such size can be observed when the product of this invention is examined under the electron microscope, less than 5% by weight of the corundum is found in the form of particles larger than 200 millimicrons in diameter.

An important characteristic of the corundum of this invention is its very high packing density in the dry state when subjected to a compressive force of about 10 tons per square inch. The pressed density of the corundum of this invention is greater than 2.0 g./cc. The unique behavior of the colloidal corundum of this invention depends in great part on its susceptibility to dense packing.

While there are many dense-packable powders of the prior art produced by fine grinding of fused alumina or tabular alumina, such powders do not have a specific surface area as high as 10 m.²/g., except when contaminated with substances such as silica or transition aluminas which are soluble in aqueous hydrofluoric acid.

Thus, the unique combination of characteristics of the corundum of this invention, are high specific surface area combined with dense-packing characteristics and freedom from non-corundum substances such as other finely divided forms of aluminum oxide.

The products of this invention include colloidal corundum in the form of a dry powder, as well as in the form of suspensions or dispersions in liquids. One preferred form of the products of this invention is an acid-stabilized, relatively concentrated colloidal solution of corundum. Such a colloidal solution is also called a "corundum sol" or a "stable colloidal dispersion of corundum."

The corundum of this invention can also be treated with dispersing agents, surface-active agents, or organophilizing agents, and dispersed in liquids other than water. For example, colloidal dispersions of the corundum particles coated with adsorbed stearate ions can be prepared in organic solvents such as chloroform or benzene.

*Method of characterizing the product*

(1) *Determination of crystallite size by X-ray diffraction.*—The method for determining crystallite size by the broadening of X-ray diffraction lines is described in "X-Ray Diffraction Procedures" by Klug and Alexander, published by John Wiley & Sons, Inc. (1956). The technique is described with particularity in chapter IX.

The application of this method of characterization to corundum is unusual because most conventional forms of corundum give sharp diffraction lines, with no measurable degree of broadening of the lines. With the colloidal corundum of the present invention, the broadening of the main diffraction lines of corundum is quite marked and easily measured.

(2) *Determination of specific surface area.*—The specific surface area of colloidal corundum can be determined by drying a sample in a vacuum at about 150° C. to remove adsorbed water or other volatile material, and then measuring the surface area by the adsorption of nitrogen. The method employed is that described in "A New Method for Measuring the Surface Area of Finely Divided Materials and for Determining the Size of Particles," by P. H. Emmett in "Symposium on New Methods for Particle Size Determination in the Sub-Sieve Range," in the Washington Spring Meeting of ASTM, March 4, 1941.

(3) *Determining the percentage of material soluble in hydrofluoric acid.*—In order to determine the amount of material in corundum that is soluble in aqueous hydrofluoric acid, the following procedure is employed:

The colloidal corundum must be in the form of a dry powder. The sample to be characterized therefore, is dried for 15 hours at a temperature of 120° C. in air. Approximately one gram of dried sample, weighed to the nearest milligram, is placed in a plastic beaker of about 250 ml. capacity. Separately, reagent grade 48% aqueous hydrofluoric acid is diluted in a plastic beaker with an equal weight of distilled water, thus giving a 24% solution of hydrofluoric acid. Fifteen grams of this solution is added to the sample of alumina powder, and the mixture is stirred thoroughly about once an hour with a plastic rod, at room temperature (around 25° C.), for 7 hours. The mixture is then diluted with distilled water to a total volume of 250 mls., and permitted to stand for about 15 hours. The clear supernatant liquid is then decanted by being drawn off by suction, and discarded, and the settled precipitate is resuspended in distilled water to a volume of 450 mls., and again permitted to settle until the clear supernatant wash water can be discarded without loss of insoluble alumina. To the insoluble residue is then added 25 mls. of normal propyl alcohol, the mixture stirred and then permitted to stand until the clear supernatant alcohol wash liquid can be decanted. The residue is then air dried at 120° C. and weighed.

The difference between the weight of the final residue and the original weight of the dried sample is the amount of material that is soluble in aqueous hydrofluoric acid. The amount of hydrofluoric acid-soluble material is expressed as a percentage of the original weight of sample.

(4) *Determination of particle size and shape by electron micrograph.*—The size and shape of the particles of colloidal corundum and their state of disaggregation can be observed by examining the material by the electron microscope. It is preferred to start with the corundum in the form of a suspension in water, preferably adjusted to a pH of about 3 with dilute hydrochloric acid. It is advantageous to first treat the supporting film that is conventionally employed on the supporting screen, with an 0.5% aqueous solution of a polymeric amphoteric electrolyte, such as gelatin, and dry this as a coating on the supporting film. Then a drop of the corundum sol or suspension is placed on the film for a few seconds, then removed, and immediately thereafter the film is washed with several drops of distilled water to wash off excess corundum before allowing it to dry. It is found that by this procedure, the gelatin coating absorbs a layer of particles representative of whatever types of corundum particles were found in the suspension. These corundum particles are irreversibly bound to the film by ionic forces so that they are not rinsed off. In this way there is obtained a representative distribution of corundum particles on the supporting film. The optimum concentration of the corundum sol or suspension that is first brought into contact with the film is determined experimentally but a concentration of from 0.1% to about 2% is normally employed.

The corundum specimen on the supporting film is then examined in the conventional manner, and electron micrographs prepared.

(5) *Determination of packing density.*—The packing density, or cold-pressed density is one of the most significant characteristics of the colloidal corundum of this invention. The packing density is determined by a standardized procedure, as follows: Three grams of dried colloidal corundum powder, previously passed through a 100 mesh screen, are placed in a steel mold having a cylindrical cavity, fitted with pistons in each end, between which the powder is compressed. The interior of the hardened steel mold is highly polished, as are the ends of the piston. These surfaces are lubricated by the application of a film of stearic acid applied as a 1% solution in a solvent which evaporates. The mold, with the sample of corundum powder between the opposing pistons, is placed in a hydraulic press and sufficient pressure applied to compress the sample under a pressure of 9 tons per square inch. This pressure is applied for about a minute, then the pressure is slowly released and the compressed pellet of corundum is carefully pushed from the mold. It is weighed to the nearest milligram, and the diameter and thickness (or length) of the cylindrical pellet are then measured with a micrometer, and the volume of the pellet is calculated. The density of the pellet is then calculated and expressed in grams per cubic centimeter.

Since the density of pure corundum is 4.0 grams per cubic centimeter, a pellet with a cold pressed density of, for example, 2.4 grams per cc., has a packing density of 60% of theoretical density.

(6) *Sinterability of colloidal corundum.*—The colloidal corundum of this invention is characterized by the fact that in the absence of other substances, the specific surface area decreases substantially when the powder is heated in air for two hours at 1150° C.

While the most finely divided corundum of the prior art having a specific surface area of around 5 m.$^2$/g. remains essentially unchanged after the above type of heat treatment, the colloidal powder of this invention, having an initial specific surface area greater than 10 m.$^2$/g., characteristically loses at least 25% of its specific surface area when heated in air for two hours at 1150° C. The higher the initial specific surface area of the colloidal corundum, the greater the change. Thus, a colloidal corundum with an initial specific surface area of 18 m.$^2$/g., will, after being heated, have a specific surface area of 9 m.$^2$/g., corresponding to a loss in specific surface area of 50%. A colloidal corundum having an initial specific area of 23 m.$^2$/g., can lose 90% of its specific surface area when heated under these conditions.

This remarkable ease of sintering at this relatively low temperature, which is far below the 2050° C. melting point of aluminum oxide, is characteristic of the colloidal corundum of this invention.

(7) *Surface basicity.*—Another characteristic of the pure colloidal corundum of this invention is when it is suspended in water and titrated with standard dilute hydrochloric acid, the surface of the corundum liberates a definite and measurable amount of hydroxyl ions per unit area of surface. In carrying out this titration, a similar volume of pure water is titrated with the same standard hydrochloric acid, and this volume of titrating solution is subtracted from that required by the suspension of sample, in order to determine the amount of acid neutralized by the surface of the alumina.

The pure colloidal corundum of this invention in distilled water has an isoelectric point of pH 9. It is found that when this suspension is titrated with dilute acid from pH 9 down to a pH of about 3.6, the basicity of the surface appears to be neutralized by the acid. Therefore the total amount of hydrochloric acid required to neutralize the basicity of the surface is determined by carrying out the titration from pH 9 to pH 3.6; it is calculated from this that the basicity of the surface, or its capacity to neutralize hydrochloric acid, is 1.2 hydroxide ions liberated per square millimicron of surface area.

The titration is carried out by suspending, for example, 80 g. of colloidal corundum in 700 g. of boiled, distilled water. In order to start with the mixture at the isoelectric point, a trace of ammonium hydroxide can be added to raise the pH to 9.0, then the mixture is titrated with 0.5 N hydrochloric acid until the pH, measured with a glass electrode in the conventional manner, reaches 3.5. Then, a corresponding volume of distilled water is similarly adjusted to pH 9 with a trace of ammonia and titrated to pH 3.6, in order to establish the blank for the water, which is subtracted from the volume of acid required for the suspension of sample. From the amount of acid adsorbed and the specific surface area of the colloidal corundum, the basicity of the sample is calculated in terms of the number of hydroxyl ions per square millimicron of surface area, the latter being determined on the dry corundum by the nitrogen-adsorption method.

(II) *The process*

The various steps of the process of this invention are as follows:

(a) *Methods of making microcrystalline corundum.*— As a first step in forming colloidal corundum, crystallites of corundum smaller than about 150 millimicrons average diameter are prepared. This can be done either by grinding macrocrystalline corundum and isolating a colloidal fraction, or by starting with an amorphous or extremely finely divided transition alumina such as gamma, theta, delta, or eta, and then converting this at elevated temperature, in the presence of silica, to produce extremely small crystallites of corundum.

(1) *By grinding macrocrystalline corundum.*—Coarse corundum or alpha alumina can be used. Thus, a form of corundum known as "Tabular Alumina," or crushed, fused and crystallized alumina, can be employed as the starting material. These coarse corundums are first crushed and pulverized to produce a fine powder with a particle size ranging from one micron to 100 microns. For example, a pulverized tabular alumina passed through a screen of 325 meshes per inch, is satisfactory.

One of the most satisfactory methods of converting this alumina powder to the colloidal state is to subject it to prolonged ballmilling in a liquid medium, using heavy balls, preferably steel. Suitable grinding media are water or ethylene glycol. During the grinding process, a substantial amount of steel is worn away and is mixed with the corundum which must later be removed by treatment with an acid.

Ballmilling can be carried out either in rotary mills or vibratory mills, but generally large rotary mills are preferred because of the greater impact of the steel balls on the alumina.

The initial stages of grinding can also be carried out with the alumina in the dry state, but it is found that when an appreciable fraction of the corundum has been converted to particles of colloidal size, the alumina tends to become caked on the walls of the mill and on the steel balls, greatly diminishing the rate of grinding. At this point the liquid grinding medium can be added.

The duration of grinding can last from a few hours to more than a week. Continuous ballmilling for five or six days is preferred, in order to convert a substantial part of the corundum to the colloidal size range.

In large mills, for example, five gallon capacity or larger, means for cooling the charge by using jacketed walls are advantageous. In mills up to two gallons in size, the development of heat is insufficient to cause difficulty.

The mills should be vented to allow escape of gas which is formed by the reaction of steel with moisture in order that no pressure builds up in the mill; otherwise there can be danger of explosion.

(2) *By converting transition alumina to corundum in the presence of silica.*—Corundum crystals of colloidal size can also be prepared by heating an aluminum oxide precursor, such as one of the transition aluminas, in the presence of silica at a temperature of 1150–1250° C.

In the absence of silica, hydrated aluminas and transition aluminas such as gamma, delta, theta, or eta are converted to alpha crystals 300 millimicrons in diameter or larger. Smaller crystals are not produced.

*Types of starting aluminas*

Fibrillar colloidal boehmite is a preferred source of alumina starting material. This material is described in U.S. Patent 2,915,475, issued Dec. 1, 1959, to John Bugosh, assigned to E. I. du Pont de Nemours & Company. Another suitable source of alumina is a voluminous, finely divided gamma alumina sold by the Godfrey L. Cabot Corp. Because of the necessity for distributing silica uniformly throughout the precursor alumina prior to its conversion to corundum, extremely finely divided and highly porous and voluminous forms of hydrated alumina or transition aluminas are preferred. Thus, aluminum hydroxide can be precipitated from alumina nitrate solution with ammonia, thoroughly washed and then blended with a soluble or colloidal form of silica while in the wet, voluminous state, and subsequently dried. On the other hand, dense macrocrystalline, nonporous hydrated aluminas are generally unsuitable sources of alumina for the process of this invention, except in those instances where the hydrated forms become highly porous when the water is removed at elevated temperatures. In this instance, the alumina should be dehydrated under conditions which produce the most porous form of transition alumina, prior to admixture with silica. Similarly, thermally decomposable aluminum salts such as basic aluminum acetate in relatively coarse crystalline form are generally unsuitable, but when pyrolyzed to produce very porous aluminas of high specific surface area, which ranges from 100 to 400 m.$^2$/g., these porous aluminas can be employed.

If the aluminum oxide precursor of corundum is impregnated or otherwise homogeneously permeated with about 0.1 to 4% by weight of soluble or colloidally subdivided silica, the resulting corundum obtained by heating the mixed alumina-silica compositions to a temperature sufficient to bring about conversion is extremely finely divided and considerably smaller than 300 millimicrons. Under suitable conditions, the corundum has a crystallite size smaller than 150 millimicrons, and under optimum conditions is about 75 millimicrons, as determined by the broadening of X-ray diffraction lines.

Sources of silica

Numerous types of soluble and colloidal silica are described in "The Colloid Chemistry of Silica and Silicates," by R. K. Iler, Cornell Press, Ithaca, N.Y., 1954. A convenient method of distributing silica through a coherent, but porous mass of alumina precursor is to impregnate it with a dilute alcoholic solution of ethyl orthosilicate. Moisture absorbed in the pores of the alumina or introduced in the alcoholic solution, along with the ethylsilicate, can be used to hydrolyze the ester to deposit silica uniformly throughout the alumina. Alternatively, a solution of sodium silicate can be passed through the hydrogen form of an ion exchange resin to produce a dilute solution of polysilicic acid, at a concentration, for example, of 1% by weight of $SiO_2$. This solution can be mixed with vigorous agitation with a dilute suspension of colloidally subdivided transition alumina, such as a voluminous gamma powder, or an aqueous colloidal solution of fibrillar alumina monohydrate, or boehmite.

In the process of this invention, colloidal silica having a particle size of 7 millimicrons can be employed instead of soluble silica. Silica sols of particle size of 15 millimicrons can also be employed, but a somewhat larger amount of silica is required. These sols can be blended, for example, in dilute aqueous solution at pH 2.5 with nitric acid, with an appropriate quantity of a 2% colloidal solution of fibrillar boehmite. When the mixture has been homogenized by intensive agitation, the pH can be raised to about 8 with ammonium hydroxide, and the resulting gelatinous mass permitted to dry. It is then heated to volatilize the ammonium salts to produce a transition alumina admixed with a minor percentage of silica.

Admixture and distribution of silica

The distribution of silica with the precursor alumina must be homogeneous on a molecular scale. Thus, it is unsatisfactory to grind sand, for example, to produce a silica flour, and mix this with a hydrated alumina. In order to be effective there should be no region of alumina as large as a tube of 0.5 micron diameter, within which no silica is found. Since the silica acts as an inhibitor of the growth of corundum crystallites when they are formed at high temperature, it is necessary that some silica be present in all regions within the mass of the alumina precursor.

Poor distribution of silica in the precursor alumina results in undesirable high local concentrations of silica. In the regions rich in silica, transformation of the transition alumina to corundum is retarded, with the result that at a given temperature less of the alumina is converted to corundum than would otherwise occur, and, furthermore, the alumina that is converted, being in regions deficient in silica, is relatively coarse and can be larger than 150 millimicrons crystallite size. Thus, for example, from 1.5 to 3% by weight of silica distributed in colloidal fibrillar boehmite gives highest yields of finely divided corundum, after being heated for 10 hours at 1150° C., when the silica distribution is most uniform. But, when the silica was first mixed with half of the colloidal fibrillar boehmite in an aqueous medium, the silica became fixed upon this part of the alumina and when the remainder of the alumina sol was blended in, this portion of the alumina was in less intimate contact with the silica. Under these conditions, the yield of corundum was appreciably reduced.

Amount of silica

The amount of silica admixed with the precursor alumina is highly critical. If too much silica is present, then conversion to corundum is detarded and the yield of corundum can be seriously reduced, not only because of the slower rate of conversion, but also because of the formation of mullite. Also, if the amount of silica is too small, the crystallite size of the resulting corundum exceeds 150 millimicrons in diameter.

Furthermore, the amount of silica that is required depends not only on the particular type of precursor alumina employed, but also upon the particle size of the colloidal silica that is used. Since best results are obtained when the precursor alumina is in the most finely divided state and when the silica is introduced in a molecular state of subdivision, the preferred alumina precursor are colloidal fibrillar boehmite of freshly precipitated aluminum hydroxide, and the preferred sources of silica are silicic acid obtained by the hydrolysis of silicic acid esters or by the removal of sodium by ion exchange from sodium silicate. Colloidal silica of extremely small particle size such as a silica sol of 7–8 millimicrons average particle size can also be used as a source of silica.

Temperature and time conversion

Broadly, the lowest possible temperature and the shortest time consistent with reasonable yields of colloidal corundum are preferred. It is known that from any given source of transition alumina precursor, the crystallite size of corundum diminishes with the temperature at which it is produced. Thus, from gamma aluminas and from the initially amorphous alumina obtained by heating basic aluminum acetate, the corundum obtained at 1200° C. in 10 hours in the absence of silica, has an average crsytallite size of about 300 millimicrons. At about 1100° C., the conversion is much slower, but the resulting corundum has a crystallite size of about 200 millimicrons. However, corundum is not readily formed at temperatures lower than about 1050° C., and any that is thus produced slowly at this temperature still has a crystallite size larger than 160 millimicrons.

According to the invention, the incorporation of a small amount of silica which has been found to repress the growth of corundum crystallites, makes it possible for the first time to obtain corundum of colloidal size. With about 1% of well distributed silica present in gamma alumina, a 90% yield of corundum with a crystallite diameter of about 75 millimicrons is obtained in 10 hours at 1150° C. When about 1.5% by weight of silica is present on the alumina, other conditions being as just described, the yield of corundum is about 70%, the crystallite size still being about 75 millimicrons. With 2.5% silica present under the same circumstances, the yield of corundum is only 20% and the crystalline size is increased to about 90 millimicrons.

At concentrations of silica lower than about 1% by weight, results tend to be erratic, probably due to the difficulty of obtaining a very uniform distribution of the silica. At a concentration of 0.3% silica by weight, the crystallite size under conditions otherwise comparable to those just described, is greater than 200 millimicrons.

While it is possible to compensate for a shorter reaction time with a higher temperature, this can only be done within rather narrow limits. For example, a temperature of 1250° C. in a period of 2 or 3 hours, will give results comparable to those obtained in 10 hours at 1150° C., but the crystallite size of the corundum tends to be less uniform. On the other hand, temperatures lower than about 1100° C. greatly reduce the rate of formation of corundum, although the crystallite size is satisfactory, being about 75 millimicrons.

These variables as to the amount of silica to be employed and the particular source of the alumina, and determining for each such composition the optimum time and temperature of conversion to corundum, can be readily determined from the above teachings by one skilled in the art.

Following degree of conversion

During the course of the conversion of the alumina precursor to corundum, the percentage conversion can be determined by removing samples from the furnace and determining the percentage of material that is soluble in aqueous hydrofluoric acid. This method has been earlier described in connection with determining the characteristics of the products of this invention. The insoluble portion of the sample represents the corundum content. In certain instances where too much silica has been employed, for example over 4% by weight, the hydrofluoric acid-insoluble residue can possibly contain some kappa alumina. The relative ratio of kappa to alpha can be determined by X-ray diffraction methods, but ordinarily this will not be necessary because under the preferred conditions, our process does not produce appreciable amounts of kappa alumina and any that is produced is rapidly converted to alpha alumina when the products of this invention are heat treated to form the dense, non-porous pure alumina ceramic bodies of this invention.

*Effect of alkali metal impurities*

The presence of metal oxides other than silica and alumina can have a deleterious effect on the operation of the process of producing colloidal corundum. As little as 0.25% of sodium present in the alumina procursor causes a measurable increase in the size of the corundum crystallites formed, even in the presence of silica. Thus, in a given instance, an increase in the sodium content from 0.04% to 0.24%, present as sodium oxide, causes an increase in corundum crystallite size from 100 to 120 millimicrons average diameter, as determined by the broadening of X-ray diffraction lines. Furthermore, the presence of sodium reduced the rate of conversion to corundum, and thus, in a given time, reduced the yield. Other metal oxides which are similarly known to react with silica to form glasses, are also deleterious.

*Effect of bulk density of the starting alumina*

As pointed out above, a highly porous or voluminous form of alumina is preferred in order to facilitate the uniform distribution of silica throughout the mass of the alumina precursor. However, if the alumina is too voluminous, it is found that the rate of conversion to corundum at a given temperature is reduced. Under such circumstances, it can be advantageous to lightly compress the alumina in order to increase the rate of conversion. This is usually required only in instances of using alumina precursors having bulk densities less than 10 or 20 lbs. per cubic foot. Gamma aluminas, for example, produced as a precipitate in the vapor phase by burning or hydrolyzing aluminum chloride vapors, are often very voluminous and as such often require compaction not only for the reasons mentioned above, but also to facilitate handling. Ordinarily, such aluminas will be suspended in water for admixture with the silica and upon subsequently being dried will be found to be considerably more dense.

(3) *Disaggregation of microcrystalline corundum by milling.*—It is obvious that if the microcrystalline corundum is prepared by grinding macrocrystalline material, then the fine corundum particles which are produced will consist of single fragments or chips. Such material when purified and isolated as hereinafter described will have the characteristic of being readily packed to a body of high density.

The extremely finely divided microcrystalline corundum obtained by converting transition alumina to crystallites smaller than 150 millimicrons in size, will invariably be found to consist of aggregates. At the temperature at which such alumina is produced, and especially in the presence of silica, there is formed a porous network of the corundum crystallites which are joined rigidly together. Accordingly, the crystallites must be separated by mechanical force. This process of disaggregation is suitably carried out by milling.

There are many forms of mills and grinders, but most of these are relatively ineffective for reducing particle size to less than about one micron. However, the ballmill in which the material is subjected to high local compressive forces between the grinding balls at the point of impact, provides a satisfactory means for crushing aggregates even of submicron size.

Ballmilling can be carried out either in a high-alumina ceramic mill with aluminum oxide balls, or in a steel ballmill with steel balls. In the high-alumina porcelain mill with alumina-porcelain balls, there is considerable abrasion of the equipment and contamination of the material being milled. By mixing the corundum powder with one or two times its weight of sodium chloride, grinding can be accomplished with minimum wear and contamination of the products. Such milling of dry materials, however, involves the difficulty that after a certain point, the finely divided powder cakes on the walls and grinding media; thereafter, grinding efficiency is greatly reduced. For this reason, grinding of microcrystalline aggregated corundum is preferably carried out in a liquid medium such as water or ethylene glycol. However, in this instance, probably because of the viscosity of the liquid, greater impact and shearing forces are required, and a steel ballmill loaded with steel balls is preferred. Contamination of the microcrystalline corundum product is not nearly as severe as in the above described high-alumina ceramic mill. Nevertheless, a certain amount of iron invariably contaminates the product.

The ballmilling of microcrystalline corundum is preferably continued for two or three days with steel balls. The mill should be vented to prevent dangerous accumulation of pressure due to evolved gases.

(4) *Purification and isolation of colloidal fraction.*— Since the process for producing discrete particles of colloidal corundum involves ballmilling, preferably with steel balls, a purification step is required to remove iron and other impurities introduced during the grinding operation. Ordinarily, it is preferred to carry out the purification step prior to the isolation of the colloidally subdivided, discrete particles of corundum from the coarser particles or aggregates of corundum that are invariably present.

However, the purification step is intimately related to the step of peptization and isolation of the colloid fraction of corundum.

It is to be understood that in order to separate the discrete particles of colloidal corundum from the larger particles, it is necessary that the colloidal particles be peptized, i.e., treated in such a way that the attraction between the corundum particles be eliminated, and, in fact, preferably a mutual repulsion developed. Peptization is most readily accomplished by adding materials to an aqueous suspension of the finely divided corundum that create an ionic charge on the particles. This can be done in a number of ways:

(1) The pH can be reduced to 3.0 with hydrochloric acid; under these conditions a suspension of pure alumina becomes peptized.

(2) A negative charge can be placed on the corundum particles by the adsorption of a variety of dispersing agents, including the solium salt of ethylenediamine tetraacetic acid, sodium pyrophosphate, sodium polymetaphosphate, sodium silicate, sodium lignosulfonte, or, in fact, any of the well known materials employed for improving the dispersion of kaolin in water.

(3) Certain highly polymeric amphoteric substances such as proteins, fish glue, and the like, are adsorbed on the surface of alumina and promote peptization in the neutral to slightly acidic conditions.

However, for proper peptization to occur at pH 3 with hydrochloric acid, the alumina must be relatively pure. The presence of iron, which reacts with hydrochloric acid, makes it difficult to maintain a low pH and the evolution of hydrogen gas seriously interferes with the separation of coarse and fine particles by sedimentation. It is also found that in the ballmilled alumina there is usually present some highly active, possibly amorphous aluminum oxide which reacts with hydrochloric acid, raising the pH to 4 or higher. Furthermore, the presence of silica even in small amounts on the surface of the alumina, brings about flocculation in this pH range, and prevents peptization. For all of these reasons, a purification step preferably precedes the acid peptization of colloidal corundum.

If peptization is to be brought about by the development of a negative charge or by the absorption of a highly hydrated polymer such as a protein, purification is not as essential, but is still desirable, particularly if there is much contamination with iron. In the particular instance of microcrystalline corundum formed from a transition alumina in the presence of a small amount of silica the ballmilled suspension is not very seriously contaminated with the grinding medium. In this instance it is possible, for example, to add sufficient sodium silicate solution to raise the pH to about 10. Under these circumstances, silicate ions are adsorbed on the surface of the alumina and the particles become peptized. Thus, the colloidally subdivided corundum can be separated from coarser material and purified subsequently by treatment with hydrofluoric acid to remove the silica and other impurities.

As mentioned earlier, however, the preferred procedure is to purify the milled microcrystalline corundum prior to peptization. The milled corundum is suspended in strong hydrochloric acid containing from 10 to 20% by weight of hydrogen chloride, and stirred until all evolution of gas ceases, and the color of the suspension, which is usually quite dark due to the presence of iron particles, changes to light gray. In this strong acid, the alumina flocculates and settles rapidly, and can therefore be washed by decantation. After settling for several hours, the relatively clear acid layer is withdrawn, the sludge resuspended in fresh water, again permitted to settle and the process repeated several times. The corundum sludge is then acidified with concentrated hydrofluoric acid in sufficient quantity to give a concentration of about 24% hydrogen fluoride in the aqueous phase. This mixture is then stirred for from 8 to 24 hours. This operation should be carried out with great care because of the hazardous nature of hydrofluoric acid. In particular, a given batch of presumed colloidal corundum should be tested with a small amount of the acid mixture, to see whether any heat develops. In some instances where the conversion of transistion aluminas to corundum is low, a substantial amount of transition aluminas will be present. These react violently with strong hydrofluoric acid, especially if the weight of aqueous acid solution is not at least five or ten times the weight of the alumina being treated. If too little acid solution is present, relative to the alumina, excessive heat develops with violent boiling and splattering of the dangerous acid solution. For this reason, it is best to have a considerable excess of hydrofluoric acid present, so that even if all the alumina dissolves, the heat that is liberated will not be sufficient to cause the acid to boil violently. Solutions of hydrofluoric acid as dilute as 5% or even lower can be used if a large enough amount and sufficiently long reaction time is employed.

After the corundum has been treated adequately with hydrofluoric acid, the mixture is diluted, the corundum permitted to settle, the excess acid drawn off, and the corundum rediluted with water and washed by decantation.

Adequate treatment with hydrofluoric acid is determined by recovering a sample of the corundum during acid treatment, and determining the percentage by weight of material that is soluble in hydrofluoric acid by the method described hereinabove for characterizing the products of this invention. The corundum is treated with an excess of hydrofluoric acid solution until there remains less than 1% by weight of hydrofluoric acid soluble material according to the test.

At this point, the corundum can be washed free from the hydrofluoric acid and soluble iron and alumina fluorides and chlorides. During this washing, the corundum remains flocculated because of chemisorbed fluoride on the surface of the particles. After washing has been continued until the pH of the wash water is between 4 and 5, ammonium hydroxide is added to the corundum suspension to raise the pH to about 10. This removes the fluoride ions, which are replaced by hydroxyl ions. The corundum in this form remains flocculated, settles rapidly and is easily washed by decantation, until the wash water has a specific resistivity higher than about 25,000 ohm-cms. Washing must be carried out with distilled or deionized water. In the final stages of the removal of excess ammonia by washing, and the final removal of fluoride and chloride ions, the pH of the diluted suspension can drop to about 7, at which point settling becomes slower. In this instance, the pH is raised to 8.5–9.0 with a small amount of ammonium hydroxide in order to facilitate washing and settling.

Throughout the purification process from the point where hydrofluoric acid is introduced, the corundum suspension should be kept in plastic-lined equipment. The suspension must not be in contact with enamel or glass, since the pure corundum surface will absorb silica from the glass, especially at high pH. Such contamination is to be avoided.

Subsequent to the above treatment, the purified corundum is ready for peptization with dilute hydrochloric acid. The impurities of silica, iron, chloride, fluoride, and hydrofluoric acid-soluble forms of alumina have all been removed, and the surface of the corundum particles is characteristic of pure corundum.

*Method of separating peptized colloidal fraction*

The purified corundum suspension near the isoelectric point is acidified with hydrochloric acid to a pH of 3.0. If the corundum has been properly purified and all acid-soluble forms of transition aluminas removed, including amorphous alumina, the pH will remain between 3 and 3.5. If some acid-soluble material still remains, the pH will drift upwards to 4 or 4.5 and flocculation will ensue.

In a properly purified corundum suspension at pH 3, the corundum particles develop a positive charge, with the acid chloride ions as counter ions in the aqueous medium. The corundum particles, therefore, repel each other and are peptized. All particles which have become mechanically broken apart will thereupon no longer remain in contact with each other. However, aggregates of corundum crystallites which have not been broken down in the milling operation will still remain as coherent particles. Since these will, of necessity, be made up of a number of corundum crystallites, the size of these aggregates is larger than the size of the individual crystallites. The aggregates will therefore settle from solution much more rapidly than the individual crystallites of colloidal size, which are typically from 75 millimicrons to 150 millimicrons in diameter.

Where the corundum is produced by ballmilling macrocrystalline corundum such as tabular alumina, there is, of course, no aggregation but instead there is a wide distribution in the size of the corundum fragments. The corundum particles or fragments larger than about 150 millimicrons in size settle relatively rapidly, while the smaller particles settle much more slowly.

The particles smaller than 150 millimicrons in diameter can be separated from the larger and heavier particles and aggregates by sedimentation or by fractional centrifuging. In the preparation of colloidal corundum on a small scale, the peptized corundum mixture is permitted to stand in plastic containers, the depth of the aqueous suspension being about 10 inches. After standing for 4 days without any agitation, the super-colloidal material will be found largely accumulated at the bottom as a heavy sediment, while most of the corundum of colloidal size is still in the supernatant liquid. It is, of course, necessary to resuspend the sediment under the same conditions of pH, and again settle for a similar period of time in order to recover the colloidal-sized material which was physically accumulated along with the larger particles in the first sediment. On a larger scale, a series of continuous centrifuges can be operated to separate the corundum particles of different size ranges.

Generally, the peptization and separation of the colloidal fraction is carried out in suspensions containing from 2 to 10% by weight of corundum. The recovered sols are therefore often quite dilute, containing from 0.5% to 10% solids.

(5) *Concentrating corundum sols—methods.*—A very dilute corundum sol is most readily concentrated by raising the pH to 9 with a small amount of ammonia, permitting the corundum to settle to yield a concentrated slurry, washing this slurry with distilled water by resettling and decanting, and then acidifying the concentrated slurry with hydrochloric acid to pH 3, whereupon a concentrated sol is readily obtained.

Alternatively, the dilute corundum sols may be concentrated by settling in the centrifuge, although this can result in some of the corundum forming a dense cake on the bottom, which must be resuspended by stirring or vigorous agitation after the clear supernatant water has been discarded. Corundum sols can, of course, also be concentrated by evaporation of water up to 75% for example.

(6) *Preparing organosols.*—Colloidal corundum in the form of an aqueous sol can be transferred in the presence of suitable additives, to organic solvents to produce organosols. In a typical procedure, a dilute corundum sol containing 5% by weight of corundum is stirred with ¼ of its volume of chloroform, and 0.5% of ammonium myristate is slowly added to the mixture with continued agitation. The amount of myristic acid to be added in the form of the ammonium salt should be such that there is present in the system 3 molecules of myristic acid per square millimicron of corundum surface. From the specific surface area of the corundum, which can, for example, be 20 m.$^2$/g., the amount of myristic acid per gram of corundum is readily calculated. When this amount of ammonium myristate has been added, the aqueous phase becomes clear, while the chloroform layer becomes very milky as the corundum passes from the water into the chloroform layer. The corundum, now coated with a monomolecular layer of myristate ions, can be subsequently transferred to higher boiling hydrocarbons, for example, by adding the chloroform sol to the hydrocarbon and distilling out the chloroform.

The particular surface-modifying agent, usually a carboxylic acid derivative, is selected in accordance with the organic liquid in which the corundum is ultimately to be dispersed. For example, for suitable dispersions in an aromatic hydrocarbon such as xylene, an aromatic carboxylic acid such as orthotoluic acid should be used in place of the myristic acid.

(7) *Forming discrete colloidal corundum powders from sols.*—To produce the purest corundum powders from an acidic aquasol, the preferred procedure is to remove the hydrochloric acid from the sol by means of an anion exchange resin, and then to dry the resulting suspension. Ordinarily, it is satisfactory to add a small amount of ammonium carbonate or bicarbonate, for example, to bring about flocculation of the colloidal corundum which will then settle from the aqueous phase which is subsequently discarded. The wet precipitate, which thus contains only a small part of the original chloride ion, now present as ammonium chloride, can be dried directly.

In evaporating organosols, the resulting corundum powder usually contains the organic additives or transfer agents which are removed at elevated temperatures.

The discrete colloidal corudum powders obtained from the above sols in the manner described have the physical characteristics of the corundum powders of this invention, and as such can be molded into dense, strong bodies of pure alumina at pressures of about 4,000 p.s.i. at the unusually low temperature of 1500° C.

They are also a useful ultrafine polishing material for producing extremely smooth surfaces on metals.

Reference to the examples appearing hereafter will enable one skilled in the art to more fully appreciate and easily practice the invention.

EXAMPLE 1

To prepare colloidal corundum by conversion of fibrillar colloidal boehmite to corundum in the presence of silica, a silica-modified alumina dispersion is first made. Nine hundred grams of "Baymal"[1] fibrillar colloidal boehmite powder is slowly added to 2100 grams of dimethylformamide in a Waring Blender with agitation. Sixty-two cubic centimeters of concentrated $HNO_3$ are also added to acidify the suspension and allow for better dispersion of the colloidal alumina therein. After mixing for five minhtes, 45.3 grams of tetraethyl orthosilicate (practical grade, manufactured and sold by Eastman Kodak Company) are added while agitating, and the agitation is continued for five more minutes. The composition is left overnight to hydrolyze the silicate ester.

The following day the dispersion is poured into 10 liters of a 1:4 ammonium hydroxide solution of pH 12 while stirring with a plastic rod. The pH of the mixture is 10.5 and the alumina has coagulated and settled. The precipitate is washed four times by decantation with ten times its volume of water, then filtered through coarse filter paper and allowed to drain and dry for one day.

The transition alumina is next converted to corundum. The solid material as obtained above is placed in a furnace at room temperature and heated in about 6 hours to 650° C., held for 10 hours at this temperature, and then heated to 1150° C. and held at this temperature for 24 hours before cooling in the furnace.

The calcined product is divided into two 2 kilogram batches. Each 2 kilogram portion is mixed with 2 liters of $H_2O$ and ballmilled for six days in a 2 gallon steel mill with 52 pounds of ⅜″ diameter steel balls to disaggregate the microcrystalline corundum.

To remove the metal impurities obtained from the mill, the slurry is removed from the mill by washing with 15 liters of water and then allowing the suspension to settle after which the clear supernatant is decanted leaving the seven liters of product slurry. Two liters of conc. HCl and one liter of $HNO_3$ are added, making the volume of the slurry 10 liters. After three hours the suspension is diluted to 18 liters with $H_2O$. Ten liters of the clear supernatant are decanted and the suspension is again diluted to 20 liters with $H_2O$. Since the supernatant is not clear, 3 kg. of $NH_4Cl$ are added to coagulate the fine dispersion.

The following day the clear supernatant is decanted and the slurry diluted in three plastic containers to 60 liters, with $H_2O$ containing 3 kg. of $NH_4Cl$. The pH is 3.7, and 300 cc. of conc. HCl are added to keep the alumina coagulated.

The dispersion is allowed to settle and the clear supernatant decanted. The resulting slurry weighs 10 kilograms. Silica and alumina forms present other than alpha are next removed by treatment with HF and washing with $H_2O$. The slurry is slowly and cautiously added to a solution containing 3500 cc. of 48% HF and 1000 cc. of $H_2O$ to make the ratio 24% HF:$Al_2O_3$ around 10:1.

The acidified slurry is occasionally stirred with a plastic rod and then allowed to settle for 8 hours. The clear supernatant is decanted and the slurry washed three times by decantation with 60 liters of $H_2O$ each time. Four more washings by decantation are made with 60 liters of 1 M $NH_4Cl$ each time.

The remaining fluoride is removed by the addition of a strong base. Thirty-two hundred grams of tetramethylammonium hydroxide are added to the washed slurry, raising the pH to 10. The dispersion is stirred continuously for 5 minutes and then intermittently stirred over a period of one day.

---
[1] Trademark registered by E. I. du Pont de Nemours & Co., for its colloidal alumina.

The dispersion is then allowed to settle overnight, the clear supernatant decanted, and the slurry washed eight times by decantation with 20 liters of distilled $H_2O$ adjusted to pH 9 with ammonia. After the eighth washing, the clear supernatant has the same specific resistance of the water used for the washings, 50,000 ohm-cm. The fluorine content was 0.04% based on the weight of $Al_2O_3$.

Finally the resulting slurry is peptized with 4 cc. of conc. HCl to obtain a pH of 3.5, and filtered through coarse filter paper. At this point 1.8 kilograms of a 1.8% $Al_2O_3$ sol are obtained.

The purified suspension of corundum is permitted to stand in a container with a depth of 10". After 3 days the pure white liquid phase is drawn off, leaving a dense, white sludge. The sludge is rediluted with $H_2O$ up to a depth of 10" and the pH again adjusted to 3.0 with a small amount of conc. HCl and again allowed to settle for 3 days. The white supernatant is again withdrawn and combined with the first sol.

A white, milky colloidal solution of corudum is obtained in this way. A sample is dried and the residue analyzed.

Surface area by nitrogen adsorption method: 24 $m.^2/g$.
X-ray analysis: $\alpha$-$Al_2O_3$ of 86 to 96 m$\mu$ crystallite size.
Percent $Al_2O_3$: 99.7.

EXAMPLE 2

To prepare colloidal corundum by conversion of a transition alumina to corundum, again a silica modified alumina dispersion is first prepared. Two hundred grams of "Alon" C,[2] a voluminous, finely divided gamma alumina are used. The "Alon" C powder is slowly added to 900 cc. of $H_2O$ while agitating in an electric disintegrator (Waring Blendor). Eighty grams of a fresh silicic acid solution containing 4 g. of $SiO_2$ are added dropwise to the alumina suspension with continued agitation. The silicic acid solution is made by diluting 10.55 g. of Du Pont "F" grade sodium silicate (28.4% $SiO_2$) with $H_2O$ to 100 g. and deionizing with a sulfonated polystyrene "Dowex" 50 cationic exchange resin in hydrogen to pH 3. Only 80 g. of this solution is added to the alumina suspension.

After stirring for 30 minutes, the suspension is frozen with a mixture of Dry Ice and acetone, and freeze-dried.

The dry powder of transition alumina is converted to corundum by being placed in an electric furnace and heated at 250° C. increments per hour to 1150° C. This temperature is then held for 24 hours.

The microcrystalline corundum obtained is disaggregated by ballmilling. Fifty grams of the powder is mixed with 50 g. of sodium chloride and ballmilled for 24 hours in a one quart steel mill with ¾" diameter steel balls.

The alumina from the mill is diluted with water and allowed to settle. The clear supernatant is decanted and the washing operation repeated until the supernatant gives a negative reaction for chloride.

The silica, silicates and metals from the steel mill are removed by overnight treatment with 500 g. of 24% HF. The clear supernatant is then decanted and the slurry washed ten times with 1000 cc. of $H_2O$.

To eliminate fluoride the slurry is then treated overnight with 500 cc. of 5% $NH_4OH$ and the clear supernatant decanted. The precipitate is then washed by decantation with 1000 cc. of $H_2O$ each time, until the pH of the slurry is 9.

A small amount of conc. HCl is then needed to adjust the pH to 3.5 and peptize the sol.

Fine colloidal fractions are obtained by permitting the sol to settle for three days and drawing off the white liquid phase.

One thousand ten grams of an alumina sol of 4.20% solids is obtained in this way. Colloidal alpha alumina yield is about 85%. This corundum has a surface area of 25 $m.^2/g.$, as measured by nitrogen adsorption, and the crystallite size as determined by X-ray diffraction is 102 m$\mu$.

EXAMPLE 3

To prepare colloidal corundum from tabular alpha alumina, two thousand grams of tubular alumina, grade T-61, obtained from the Aluminum Corporation of America, 100% of which passes a 325 mesh screen, is placed in a two gallon steel ballmill which is half filled with steel balls, along with two thousand grams of water. The mill is fitted with a vent to relieve any pressure that might have built up due to release of gases. The mill is rotated on horizontal rollers at 35 r.p.m., for 144 hours. The gray charge is washed from the mill with water, yielding 11 kilograms of suspension. This is permitted to settle, the supernatant water discarded, and the resulting 3 kilograms of dark gray sludge is mixed with 1 kilogram of concentrated hydrochloric acid and one kilogram of 70% nitric acid, and the mixture stirred for one day. The mixture is then diluted to a volume of 20 liters with water, permitted to settle for 24 hours, and the supernatant green liquid is discarded. The remaining 4.5 kilograms of wet sludge is again diluted to 20 liters with water. Since the mixture does not settle very rapidly, 200 g. of hydrochloric acid are added to promote flocculation, and the mixture is allowed to settle again for 24 hours and decanted. This washing is again repeated, adding 700 g. of concentrated hydrochloric acid to the 20 liters of slurry, followed by settling and decantation. To 3 kilograms of wet sludge containing an estimated 2 kilograms of alumina, there is added 1 kilogram of 48% hydrofluoric acid solution. The mixture is stirred for 3 hours in a plastic container with a plastic agitator. The hydrofluoric acid is removed by diluting the mixture to 20 liters with distilled water, settling, removing the clear supernatant liquid, and repeating the diluting, settling, and decanting operations five times until the pH in the mixture is 4.0 and the specific resistivity is 30,000 ohm-cm. The settled corundum sludge, weighing 4.6 kilograms, is then rendered basic to a pH of 10.5 by the addition of 275 g. of 0.5 N tetramethylammonium hydroxide solution. This mixture is then diluted to a volume of 25 liters with distilled water, permitted to settle, and the supernatant liquid decanted, and the diluting and decanting process repeated four more times until the specific resistivity of the final corundum slurry, which weighs 3.6 kilograms, is 75,000 ohm-cm., and the pH is 7.5.

This purified suspension of corundum is then acidified with 70 mls. of 0.5 N hydrochloric acid to give a suspension with a pH of 3.0. After 1 day the pH is still 3.1, indicating that acid-soluble impurities have all been removed. After permitting the corundum residue to stand for a period of 24 hours in a container to which water has been added to a total depth of 10", the pure white liquid phase is drawn off, leaving a dense, white sludge. The sludge is rediluted to a volume of 1 liter with water, and the pH again adjusted to 3.0 with a small amount of hydrochloric acid, and again permitted to settle for one day, and the white supernatant sol again withdrawn and combined with the first sol.

The heavy sludges contain about 65% by weight of alumina, with specific surface areas of 2.1 and 4.5 square meters per gram, respectively. The sol that is recovered contains 4.5% by weight of colloidal corundum. This sol is then concentrated by centrifugation to yield a viscous concentrated sol containing 70% by weight of $Al_2O_3$. When dried this sol yields an alumina powder having a specific surface area of 16 square meters per gram, and by the broadening of X-ray diffraction lines, having a calculated crystallite size of 48 millimicrons. The colloidal corundum thus recovered weighs 480 grams, on a dry basis. The yield of colloidal corundum based on the starting material is therefore 24%. A sample of the dried corundum powder, cold pressed at 10 t.s.i., is found to have a cold pressed density of 2.30 gms./cc.

---

[2] Trademark registered by Cabot Corp. of Boston, Mass., for its alumina powder.

The invention claimed is:

1. A microcrystalline corundum powder consisting essentially of particles of alpha alumina containing less than 1% by weight based on the alumina, of hydrofluoric-acid-soluble metal oxides, said particles being further characterized by having a specific surface area greater than 10 square meters per gram, a cold pressed density of at least 2.0 grams per cubic centimeter at a pressure of 10 tons per square inch, and a crystallite size of less than 160 millimicrons as determined by X-ray diffraction.

2. A microcrystalline corundum sol consisting essentially of an aqueous dispersion of from about 0.5% to 10% by weight of particles of alpha alumina which contain less than 1% by weight based on the alumina of hydrofluoric-acid-soluble metal oxides, said particles further characterized by having a specific surface area greater than 10 square meters per gram, a cold pressed density of at least 2.0 grams per cubic centimeter at a pressure of 10 tons per square inch, and a crystallite size of less than 160 millimicrons as determined by X-ray diffraction.

3. A microcrystalline corundum organosol consisting essentially of a dispersion of a sufficient amount of a surface modifying agent selected from the group consisting of carboxylic acids and their salts such that there are three molecules of agent per square millimicron of corundum surface, and from 0.5% to 10% by weight based on the total weight of organosol of particles of alpha alumina in an organic solvent, said alpha alumina containing less than 1% by weight based on the alumina of hydrofluoric-acid-soluble metal oxides, said particles further characterized by having a specific surface area greater than 10 square meters per gram, a cold pressed density of at least 2.0 grams per cubic centimeter at a pressure of 10 tons per square inch, and a crystallite size of less than 160 millimicrons as determined by X-ray diffraction.

4. A process for preparing particulate microcrystalline alpha alumina characterized by containing less than 1% by weight based upon the alumina of hydrofluoric-acid-soluble metal oxides, having a specific surface area greater than 10 square meters per gram, having a cold pressed density of at least 2.0 grams per cubic centimeter at a pressure of 10 tons per square inch, and having a crystallite size of less than 160 millimicrons as determined by X-ray diffraction, said process comprising the steps of subjecting a microcrystalline corundum to attrition, separating the particles of corundum having a crystallite size of less than 160 millimicrons from coarser particles, purifying of the separated particles of corundum by contacting them with an excess of a strong aqueous solution of hydrofluoric acid, separating the insoluble corundum from the resulting acid solution of soluble aluminum salts, recovering the insoluble corundum, contacting the recovered corundum with a weak base to replace adsorbed fluorine ions with hydroxyl groups, and separating the fluoride-free corundum from the solution of base.

5. The process of claim 4 wherein the weak base used to replace adsorbed fluoride ions on the corundum is ammonium hydroxide.

6. The process of claim 4 wherein the aqueous hydrofluoric acid solution ranges from 5% to 50% by weight solids.

7. The process of claim 4 wherein the fluoride-free corundum separated from the base is dried to form a particulate microcrystalline corundum powder.

8. A process for preparing particulate microcrystalline alpha alumina characterized by containing less than 1% by weight based upon the alumina of hydrofluoric-acid-soluble metal oxides, having a specific surface area greater than 10 square meters per gram, having a cold pressed density of at least 2.0 grams per cubic centimeter at a pressure of 10 tons per square inch, and having a crystallite size of less than 160 millimicrons as determined by X-ray diffraction, said process comprising forming a microcrystalline corundum by ballmilling in a liquid medium macrocrystalline corundum powder, separating the particles of corundum having a crystallite size of less than 160 millimicrons from coarser particles, purifying of the separated particles of corundum by contacting them with an excess of a strong aqueous solution of hydrofluoric acid, separating the insoluble corundum from the resulting acid solution of soluble aluminum salts, recovering the insoluble corundum, contacting the recovered corundum with a weak base to replace adsorbed fluorine ions with hydroxyl groups, and separating the fluoride-free corundum from the solution of base.

9. A process for preparing particulate microcrystalline alpha alumina characterized by containing less than 1% by weight based upon the alumina of hydrofluoric-acid-soluble metal oxides, having a specific surface area greater than 10 square meters per gram, having a cold pressed density of at least 2.0 grams per cubic centimeter at a pressure of 10 tons per square inch, and having a crystallite size of less than 160 millimicrons as determined by X-ray diffraction, said process comprising admixing from 1% to 3%, by weight, of silica with a microcrystalline aluminum oxide precursor, converting said aluminum oxide precursor to microcrystalline corundum by heating the precursor-silica admixture to a temperature ranging from 1150° C. to 1250° C., disaggregating the microcrystalline corundum by ballmilling in a liquid medium, separating the particles of corundum having a crystallite size of less than 160 millimicrons from coarser particles, purifying of the separated particles of corundum by contacting them with an excess of a strong aqueous solution of hydrofluoric acid, separating the insoluble corundum from the resulting acid solution of soluble aluminum salts, recovering the insoluble corundum, contacting the recovered corundum with a weak base to replace adsorbed fluorine ions with hydroxyl groups, and separating the fluoride-free corundum from the solution of base.

10. A process for preparing a sol of microcrystalline alpha alumina, said alumina characterized by containing less than 1% by weight, based upon the alumina, of hydrofluoric-acid-soluble metal oxides, having a specific surface area greater than 10 square meters per gram, having a cold pressed density of at least 2.0 grams per cubic centimeter at a pressure of 10 tons per square inch, and having a crystallite size of less than 160 millimicrons as determined by X-ray diffraction, said process comprising the steps of subjecting a microcrystalline corundum to attrition, separating the particles of corundum having a crystallite size of less than 160 millimicrons from coarser particles, purifying the separated particles of corundum by contacting them with an excess of a strong aqueous solution of hydrofluoric acid, separating the insoluble corundum from the resulting acid solution of soluble aluminum salts, recovering the insoluble corundum, contacting the recovered corundum with a weak base to replace adsorbed fluoride ions with hydroxyl groups, separating the fluoride-free corundum from the solution of base and peptizing the fluoride-free corundum to form a sol.

References Cited
UNITED STATES PATENTS

| | | | |
|---|---|---|---|
| 2,590,833 | 4/1952 | Bechtold et al. | 252—313 |
| 2,696,474 | 12/1954 | Heard | 252—309 |
| 3,268,295 | 8/1966 | Armbrust et al. | 23—141 |

LEON D. ROSDOL, *Primary Examiner.*

R. D. LOWERING, *Assistant Examiner.*